United States Patent [19]

Sherritt et al.

[11] 4,014,016
[45] Mar. 22, 1977

[54] AUDIO INDICATING SYSTEM

[75] Inventors: Jay G. Sherritt; Joseph A. Eccher, both of Boulder, Colo.

[73] Assignee: Ball Brothers Research Corporation, Boulder, Colo.

[22] Filed: Nov. 29, 1974

[21] Appl. No.: 528,120

[52] U.S. Cl. .................. 340/384 R; 340/365 R; 340/365 S; 340/345
[51] Int. Cl.² .................. G08C 19/22; G08B 3/10
[58] Field of Search ............. 340/345, 365 S, 359, 340/384 E, 365 R, 384 R, 407, 220; 179/2; 178/DIG. 35; 360/79, 80 A

[56] References Cited
UNITED STATES PATENTS

| | | | |
|---|---|---|---|
| 3,523,161 | 8/1970 | Lewin | 340/365 S |
| 3,576,433 | 4/1971 | Lee | 340/365 S |
| 3,725,906 | 4/1973 | Quick | 340/365 R |
| 3,845,473 | 10/1974 | Kawishima | 340/365 S |

*Primary Examiner*—Harold I. Pitts
*Attorney, Agent, or Firm*—O'Rourke, Harris & Hill

[57] ABSTRACT

A sightless indicating system and method is disclosed that is useful as an indicating device for diverse equipment, including equipment such as an electronic calculator, and is particularly useful by a blind person. When utilized as a part of an electronic calculator, a standard calculator keyboard is modified to include a sign key and an output key so that an operator can initiate output indications and determine the sign of such indications in addition to initiating the customary numerical and function inputs. The customary numerical and function inputs are processed in conventional manner except that the calculator output is converted to a sightless indicating form, such as audible signals indicative of output. For an audible indication of the modified calculator, the output key is depressed and the value of each digit to be indicated is converted to a series of equally spaced output tones at substantially the same frequency with a different number of tones being utilized for each digit to differentiate therebetween. In addition, a steady, low-level output tone is utilized to indicate a decimal point in the audible output of a calculator, while an output tone of the same frequency as that used to indicate digits is utilized to indicate the sign of the output when the sign key on the keyboard is depressed. Manual or automatic sequencing modes can be selected and in the automatic sequencing mode, the output key need be depressed only once for indication of all digits whereas in the manual mode, the output key must be depressed for each digit to be indicated with leading zeros being suppressed in either operational mode.

26 Claims, 7 Drawing Figures

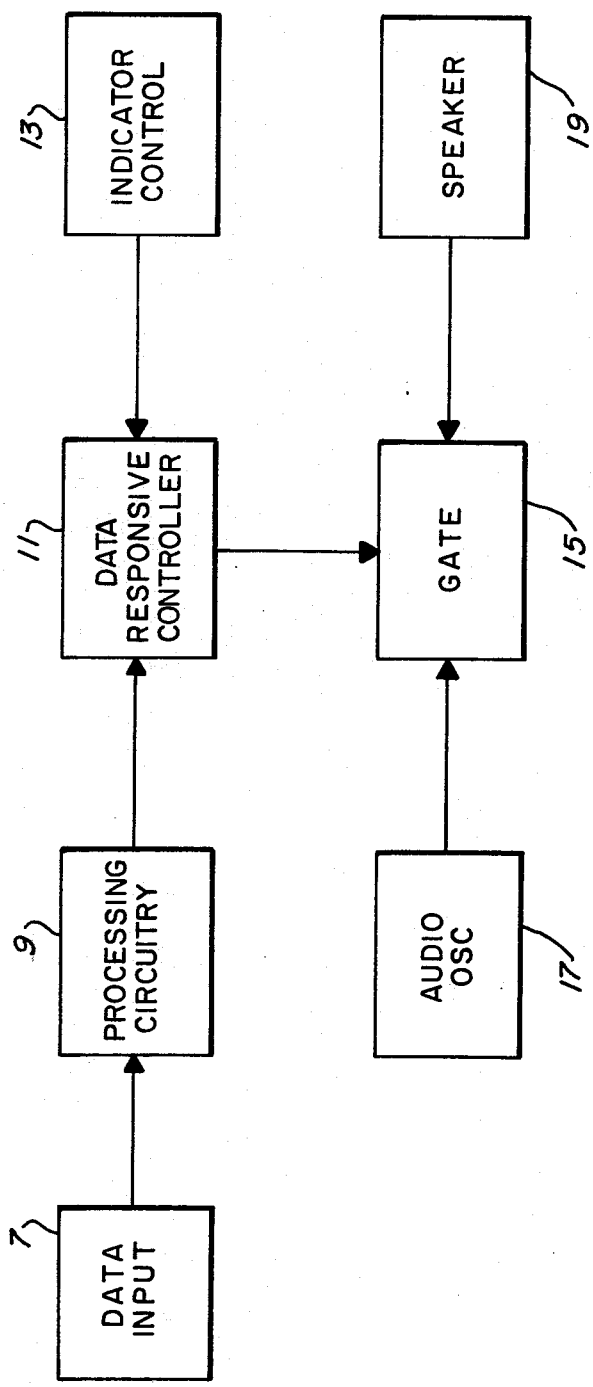
Fig_1

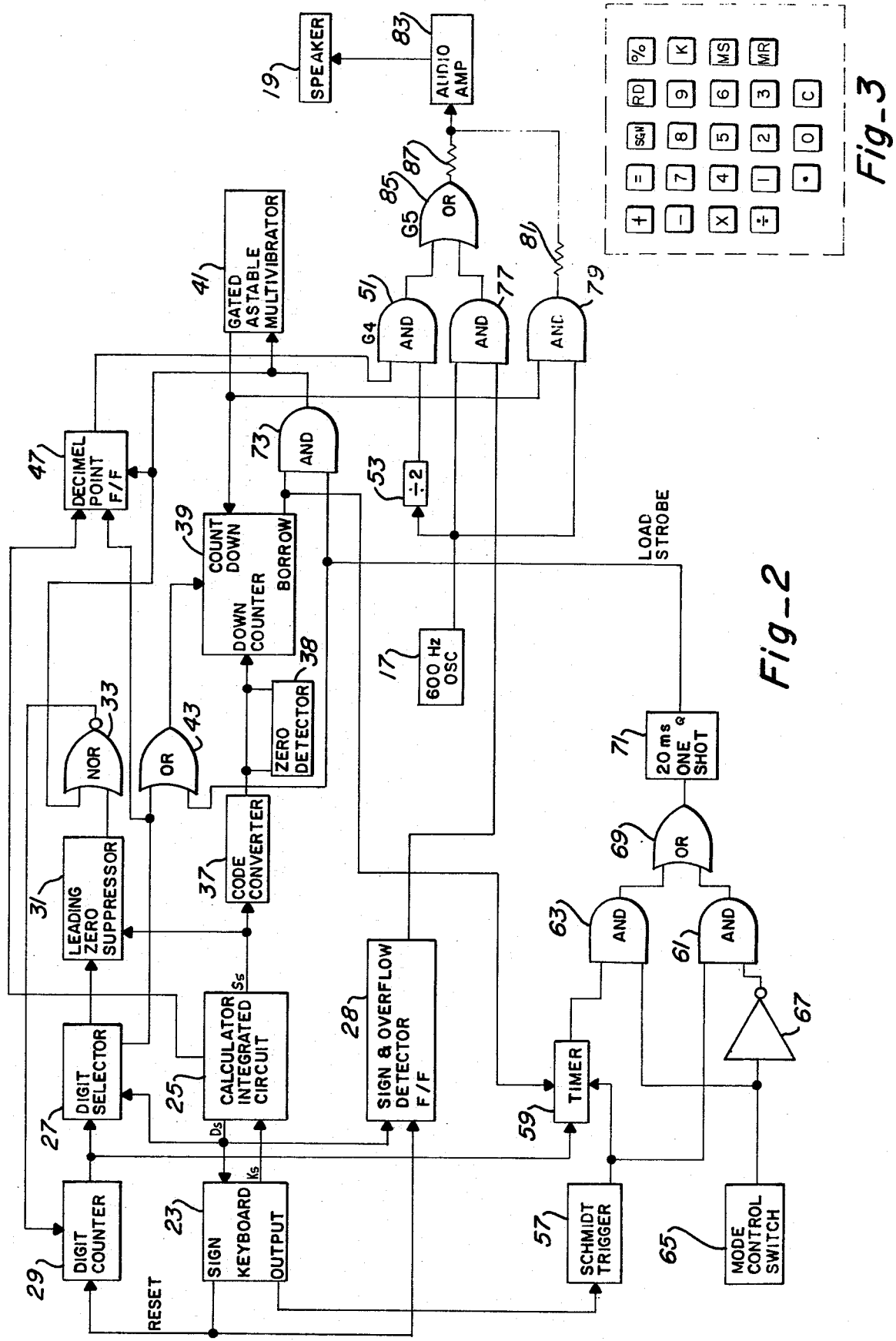

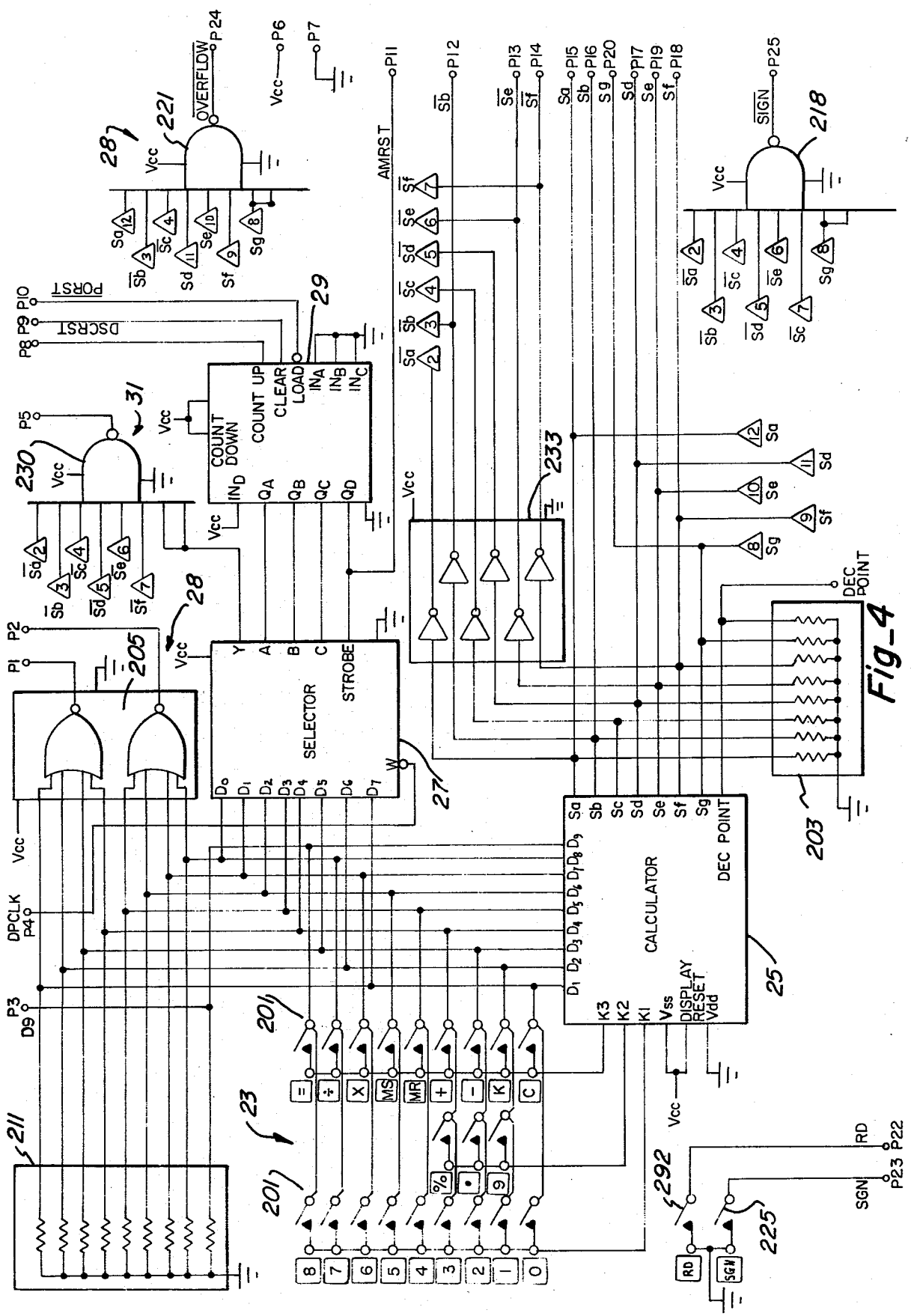
Fig_4

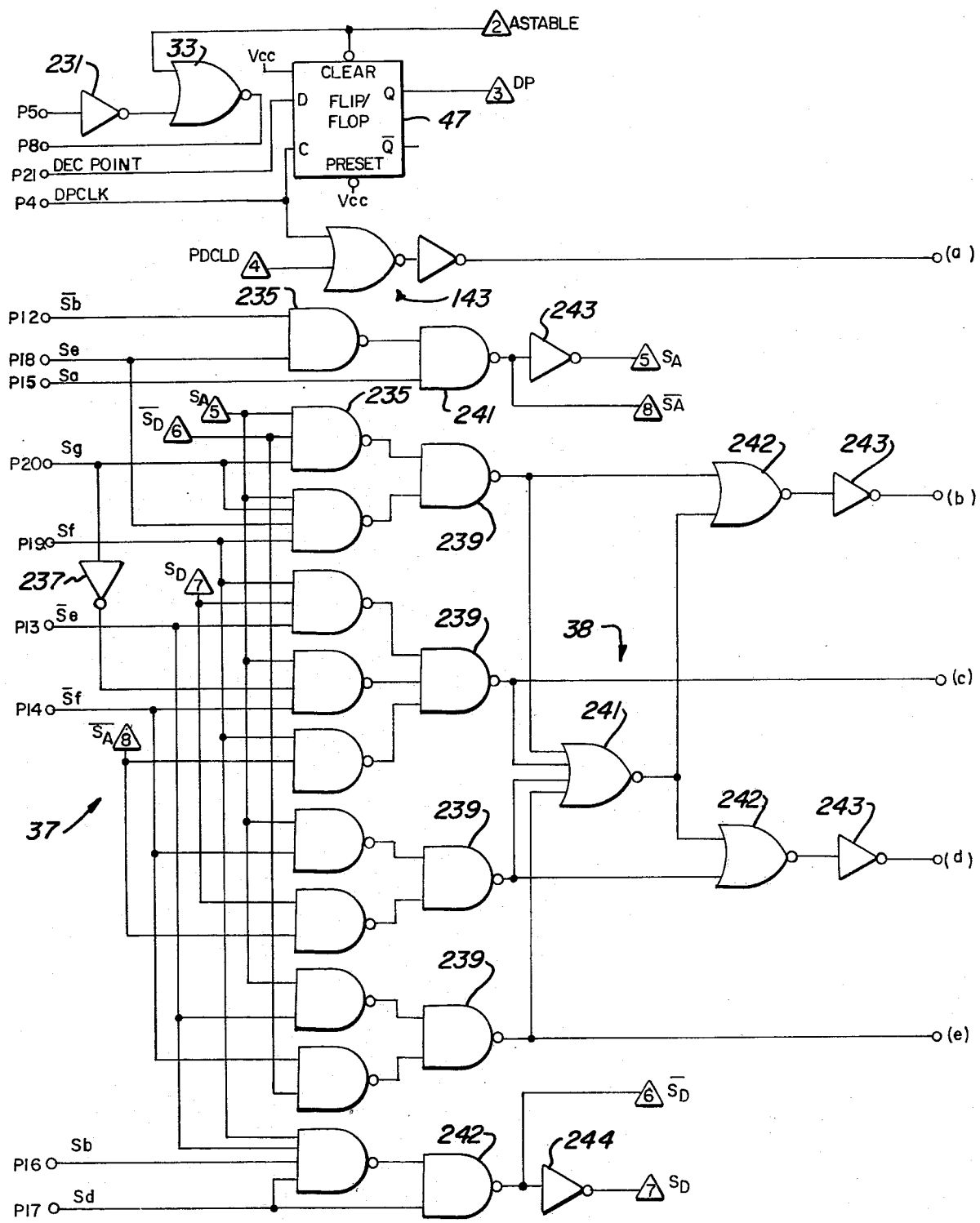
Fig_5

AUDIO INDICATING SYSTEM

FIELD OF THE INVENTION

This invention relates to an indicating system and method and, more particularly, relates to an audio indicating system and method that is particularly useful by blind persons.

BACKGROUND OF THE INVENTION

It is oftentimes desirable, and sometimes necessary, that certain indications be made in a form other than in a conventional display that requires use of sight. In the conventional hand-held electronic calculator, for example, it is common to display the calculator result on a visual display, normally light-emitting diodes.

While visual readouts may be satisfactory where the user has either the faculty of sight or has few visual diversions (which might not be true, for example, when visual observations must be made of other equipment or factors), equipment usefulness could be enhanced if a non-visual indication could be provided. A non-visual, or sightless, indicating system is particularly useful, of course, in that it enables a blind person to use such equipment.

It has heretofore been suggested that voice indications could be provided for apparatus such as a digital voltmeter or a drum-type counter indicator (see, for example, U.S. Pat. Nos. 3,081,431 and 3,163,819). It has also been suggested that an indicator can be provided to produce a limited number of tones of different frequency to establish value ranges or conditions (see, for example, U.S. Pat. Nos. 3,355,706, 3,089,119 and 3,346,857). In addition, it has heretofore been suggested that an audio output could be provided having a frequency that varies with measured resistance for uses such as testing equipment and frequency generator circuitry (see, for example, U.S. Pat. Nos. 3,689,832 and 3,758,885).

Such devices have not, however, proved to be completely successful in providing audible indications for at least some equipment, including electronic calculators. In addition, no known apparatus proved to be completely suitable for providing audible output signals in equipment usable by blind persons, and no known apparatus has been completely successful in indicating digital information in audible form that includes a plurality of audible output signals at the same frequency.

SUMMARY OF THE INVENTION

This invention provides an indicating system and method that does not depend upon visual observation. A sightless output, such as an audio indicating outputs, enables equipment use by blind persons and, for audio indications, audible outputs at substantially the same frequency are provided with the number of such outputs reflecting different values. When utilized as a part of an electronic calculator, the number of audible output tones indicates a number equal to the digit value for each digit to be read out, and decimal point and sign information are also provided.

It is therefore an object of this invention to provide an improved indicating system and method.

It is another object of this invention to provide an improved indicating system that is non-visual and, therefore, a sightless indicating system.

It is another object of this invention to provide an improved indicating system that includes audible indications.

It is another object of this invention to provide an improved indicating system that is suitable for use by blind persons.

It is yet another object of this invention to provide an improved indicating system that is suitable for use as a part of an electronic calculator.

It is still another object of this invention to provide an improved indicating system that is useful in an electronic calculator to provide audible indications therefor.

It is still another object of this invention to provide an improved indicating system for use in an electronic calculator wherein audible output tones are produced at substantially the same frequency for indicating purposes.

It is still another object of this invention to provide an improved indicating system for use in an electronic calculator wherein said system includes an audible indication of both sign of output and decimal point.

It is yet another object of this invention to provide an improved method for providing an audible indication.

It is yet another object of this invention to provide an improved method for providing audible indications for an electronic calculator.

With these and other objects in view which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a block diagram of the indicating system of this invention utilized as audible indications;

FIG. 2 is an expanded block diagram of the indicating system of this invention as shown in FIG. 1 and as a part of a calculator;

FIG. 3 is a typical illustration of a keyboard layout modified in accordance with this invention; and FIGS. 4 through 7 is a combined block and electrical schematic diagram of a working embodiment of this invention.

DETAILED DESCRIPTION OF THE INVENTION

Figure 6:
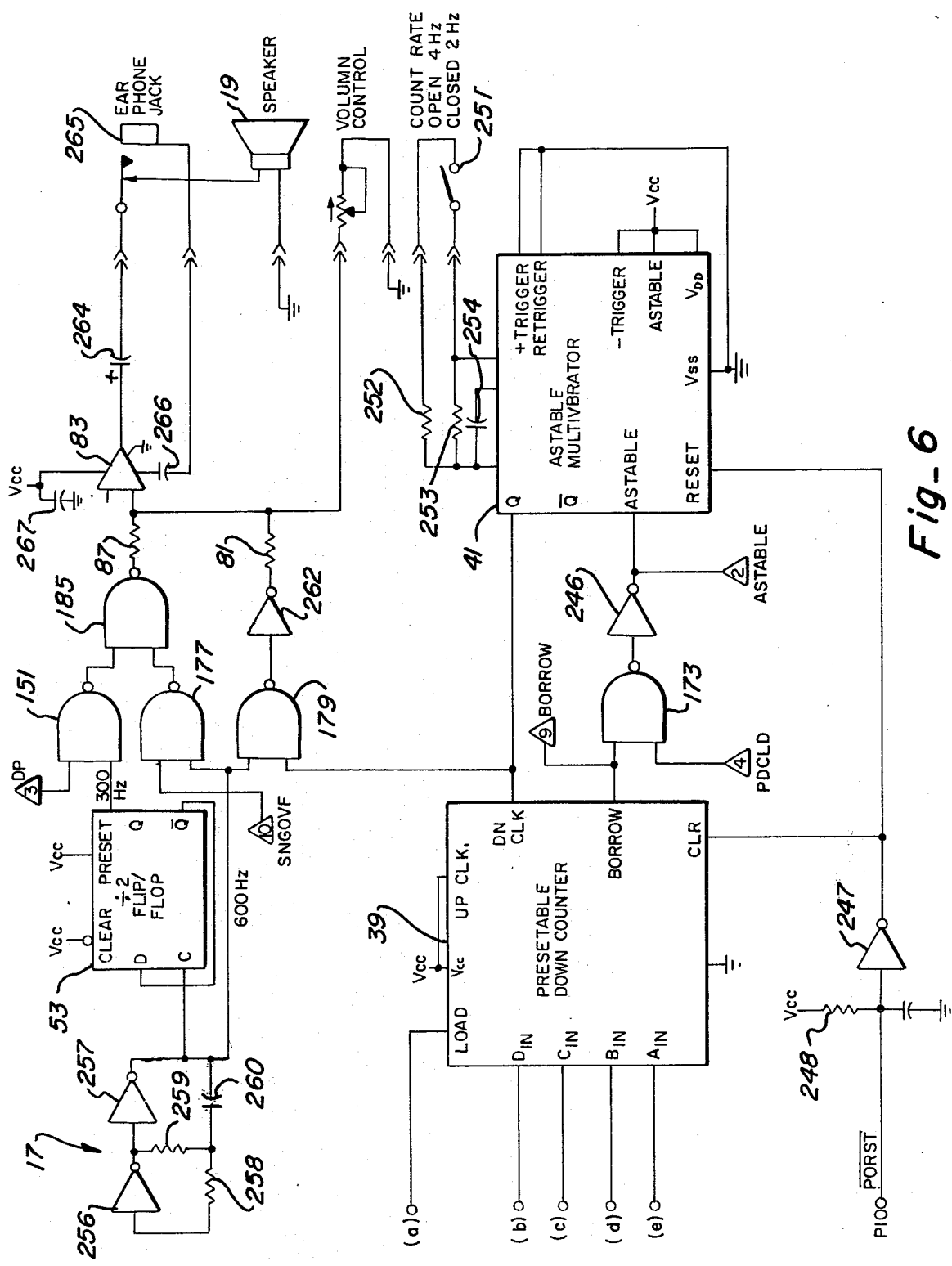

This invention provides a non-visual, or sightless, indicating system and is particularly useful when utilized with such equipment as an electronic calculator to adapt said calculator for use by a blind person. It is to be realized, however, that the system could be utilized in many diverse equipments where a sightless indicating output is desired and could be utilized, for example, by any person not able to make visual observations or where visual observations are not convenient. In addition, it is also to be realized that, while the embodiment shown and described herein provides for audible indications, other sightless indicating systems, such as, for example, providing an output that can be felt by an operator, could be utilized without departing from the intended scope of this invention.

As shown in FIG. 1, a data input device 7 provides input data in conventional fashion to processing circuitry 9. This could be accomplished, for example, by a standard keyboard of a calculator, illustrated typically in FIG. 3, providing function and numerical inputs to the standard, or conventional, processing, or calculating, circuitry of an electronic calculator. In the processing circuitry of such a calculator, the calculator performs the necessary function, such as, for example, addition, subtraction, multiplication or division, as is well known.

In conventional electronic calculators, a suitable output from the processing circuitry is normally coupled to a visual display for readout, such display being commonly by means of light-emitting diodes (not shown). In this invention, a visual display is not utilized and, instead, a sightless, or non-visual, indicating system is provided.

As shown in FIG. 1, the output from processing circuitry 9 is coupled to a data responsive controller 11. Controller 11 is controlled by indicator control 13, and provides an output to gate 15. Gate 15 is disposed between audio oscillator 17 and speaker 19, and thus, by controlling the operation of gate 15, speaker 19 is caused to produce an output that accurately reflects input information to data responsive controller 11. When utilized as a part of a calculator, speaker 19 provides an output for each digit with each output reflecting the retrievable information supplied to controller 11.

For example, by controlling operation of gate 15 so that a series of output tones are provided by speaker 19, the outputs will reflect a predetermined number provided by the processing circuitry input to controller 11. If the intended calculator output is to indicate, for example, 57, then controller 11 causes gate 15 to be opened, or operated, five times, so that five audible tones are produced at speaker 19, followed by opening gate 15 seven times so that seven audible indications or tones are provided by speaker 19. Thus, one listening to speaker 19 can readily determine the calculator answer, or result.

While the frequency utilized by audio oscillator 17 could be any convenient frequency in the audible range, it has been found that a frequency of about 600 Hertz is preferred, and it has also been found that each output tone to speaker 19 should have a duration of approximately 125 milliseconds with a spacing of about 125 milliseconds between signals to thus establish a 50% duty cycle. It has also been found, as indicated hereinabove, preferably to use one output tone for the digit "1", two output tone signals for the digit "2", etc.; and it has been found that ten output tone signals are preferred for the digit "0".

FIG. 2 is an expanded block diagram of the audio indicating system of this invention utilized as a part of a calculator. As shown, a standard keyboard 23 may be utilized with this keyboard being modified from the conventional keyboard (see FIG. 3) such as may be utilized as a part of a hand-held calculator, for example, by the inclusion of two extra keys—a sign key and an output, or "read", key.

The numerical and function inputs to the calculator are conventional and are initiated by standard keyboard 23 coupled to conventional processing circuitry 9 within the calculator, indicated in FIG. 2 as being calculator integrated circuit 25. Typically, a calculation is performed as initiated by standard keyboard 23, which could be, for example, a multiplication, division, subtraction or addition of numbers. The calculator result (or numbers stored) is maintained until the read, or output, key on keyboard 23 is depressed at which time the calculator functions to cause the audible output for each digit. In addition, by first actuating the sign key on keyboard 23, this indicates the sign, be it plus or minus, of the result of the calculator which is then indicated by depressing the output key.

As indicated in FIG. 2, the output from the calculator integrated circuit 25, which are normally digit strobes (nine such outputs are normal) are intercoupled with the keyboard in conventional fashion and also coupled to digit selector 27 and sign and overflow flip-flop 28. Sign and overflow detector flip-flop 28 is utilized to indicate the sign of the output and also to indicate an overflow condition if such a condition should occur to thus prevent an erroneous output indication.

Digit selector 27 receives an input from digit counter 29 as well as the input from the calculator integrated circuit 25. Digit selector 27 provides an output to leading zero suppressor 31 which also receives an input from the segment output of calculator integrated circuit 25 with the output from the leading zero suppressor 31 being coupled to NOR gate 33. The output from NOR gate 33 is coupled to digit counter 29, which also receives a reset signal due to actuation of the sign key on keyboard 23.

The segment output (indicated as Ss) from the calculator integrated circuit 25 is coupled to a code converter 37, which code converter is utilized where the normal output from the integrated circuit is a conventional seven segment input that is normally used to drive light-emitting diode readouts. Code converter 37 converts the received signal to a binary coded decimal (BCD) output which is then coupled to a conventional presettable down counter 39, which counter normally receives a binary coded decimal input.

Counter 39 is connected with gated astable multivibrator 41 so that the multivibrator is enabled for a period of time depending upon the load to the down counter which, in turn, causes a gate to be repeatedly opened and speaker 19 to provide the tone signal output signals indicative of the calculator result, this being one tone for a "1", two for a "2", etc.

The load to down counter 39 is coupled thereto through OR gate 43, one input to which is coupled from digit selector 27 with the other input being coupled thereto from the indicator control. In addition, the output from digit selector 27 coupled to OR gate 43 is also coupled to decimal point flip-flop 47 which has a second input coupled thereto from calculator integrated circuit 25.

Decimal point flip-flop 47 provides one input to AND gate 51, which gate receives a second input from the divide-by-two (÷2) circuit 53. Divide-by-two circuit 53 receives an output from the 600 Hertz oscillator 17 and supplies a 300 Hertz output signal. Thus, when AND gate 51 produces an output, a 300 Hertz signal is coupled to speaker 19 which produces a lower frequency tone that is indicative of the placement of the decimal point in the readout.

An output indication is initiated by an output from keyboard 23 (due to actuation of the output key) which is coupled to Schmidt trigger 57, as shown in FIG. 2. Schmidt trigger 57 provides an input to timer 59 and also to AND gate 61. The output from timer 59 is coupled to AND gate 63 with a second input to AND gates 61 and 63 being coupled from mode control switch 65. As shown in FIG. 2, a NOT circuit 67 is connected between mode control switch 65 and AND gate 61. The outputs of AND gates 61 and 63 are coupled through OR gate 69 to a 20 milli-second one-shot multivibrator 71.

AND gates 61 and 63, along with load control switch 65, determine the mode of operation of the device, that is, either manual or automatic. In the manual mode, the keyboard output switch must be actuated for each digit to be indicated. In the manual mode, one-shot multivibrator 71 is energized for 20 milliseconds each time that the output switch on keyboard 23 is actuated. In the automatic mode, the output key need only be actuated once and timer 59, connected to the output of Schmidt trigger 57, causes repeated outputs from multivibrator 71 so that each digit is sequentially indicated by presentation to the speaker 19 prior to disabling of the timer circuitry after all digits have been indicated. An output from digit counter 29 is also coupled to timer 59, as is the borrow output from down counter 39 to control the timer for automatic sequencing.

The output from one-shot multivibrator 71 is coupled to AND gate 73 connected between the borrow output of down counter 39 and one input to gated astable multivibrator 41. In addition, the output from one-shot multivibrator 71 is also coupled to one input of OR gate 43. Since the output from one-shot multivibrator 71 is normally a logical one, the output goes to logical zero during the time of the output indication.

As is also indicated in FIG. 2, the output from 600 Hertz oscillator 17 is coupled to one input of AND gate 77 and also to one input of AND gate 79. The second input to AND gate 77 is provided from sign and overflow detector flip-flop 28 and this enables the output to speaker 19 to be indicative of sign when the sign key is actuated and also is indicative of overflow to preclude an erroneous indication of calculator output. The overflow indication is a 600 Hertz tone that occurs immediately after depressing the equal (=) key on standard keyboard 23. The overflow is detected by flip-flop 28, which flip-flop controls gate 77.

The second input to AND gate 79 is coupled thereto from gated astable multivibrator 41 and opens the gate under the control of multivibrator 41 so that, if the number "6", for example, has been loaded into the counter, the multivibrator is enabled for six oscillations to open AND gate 79 six times for a time interval of 125 milliseconds with the gate being closed for a period of 125 milliseconds between each opening. This results in the speaker providing outputs for 125 milliseconds at a frequency of 600 Hertz each time that the gate 79 is opened with the signal from the oscillator being coupled through AND gate 79, resistor 81, and audio amplifier 83 connected with speaker 19. The outputs from AND gates 51 and 77 are also connected to audio amplifier 83 through OR gate 85 and resistor 87.

In operation, after a calculation has been completed, the sign key on keyboard 23 is actuated and the sign of the calculation is indicated with an output at a frequency of 600 Hertz indicating a minus (−) result and the absence of an output when the sign key is actuated indicating a positive (+) result. When the output key on keyboard 23 is then actuated, only the most significant digits are indicated with all leading zeros being suppressed by leading zero suppressor 31 and accompanying circuitry. As also mentioned hereinabove, the indicating mode is selected so that either an automatic mode for automatic sequencing of each digit or a manual mode for digit indications can be effected. Automatic sequencing for the automatic mode differs only slightly from the manual mode in that gate 63 is enabled to establish the automatic mode while gate 61 is disabled. The timer causes one-shot multivibrator 71 to fire and then after a delay of 1.5 seconds will again cause the one-shot multivibrator to fire until each of the digits have been indicated. When all the digits have been indicated, then the output from the digit counter inhibits timer 59 until a new output indication is initiated.

After each calculation in the calculator integrated circuit 25, the sign of the result is detected by a logic gate and stored in sign and overflow detector flip-flop 28. Flip-flop 28 controls gate 77 so that, when the sign key on keyboard 23 is actuated, the 600 Hertz oscillator output from oscillator 17 is allowed to pass through AND gate 77 and OR gate 85 to speaker 19 which is driven by audio amplifier 83 if the sign is negative, but will not be allowed to pass through gate 77 if the sign is positive.

Actuation of the output key on keyboard 23 causes 20 millisecond one-shot multivibrator 71 to fire. The complement output of multivibrator 71 is utilized so that the normal logical one output goes to a logical zero for the timing period. This logical zero is applied to one input of gate 43. Since the other input of gate 43 is connected to digit selector 27, the digit selector is allowed to load the first non-zero digit into down counter 39. In this manner, any leading zeros are suppressed by the leading zero suppression circuitry which has previously incremented the digit counter up to the first non-zero digit.

When a digit is loaded into down counter 39, the borrow output of down counter 39 goes to a logical one and this allows gated astable multivibrator 41 to begin oscillating at the end of the load strobe pulse from one-shot multivibrator 71, this pulse returning to a one at the end of the timing pulse. Multivibrator 41 then oscillates to decrement the down counter 39 and at the same time the 600 Hertz oscillator provides an output through AND gate 79 to speaker 19. The output of gated multivibrator 41 is thus a square wave signal so that the gated 600 Hertz tones produced at the speaker 19 are based upon a 50% duty cycle, that is each output tone signal endures for 125 milliseconds with a spacing of 125 milliseconds therebetween.

After resettable down counter 39 is decremented to zero, the borrow output goes to a logical zero and this inhibits gated astable multivibrator 41 from further oscillations. The number of cycles produced by gated astable multivibrator 41 is equal to the magnitude of the digit that was loaded into down counter 39 and, hence, the number of output tones appearing at speaker 19 is equal to the number of the digit that was loaded into down counter 39.

A logic signal from gate 73 coupled to gated multivibrator 41 is also coupled to NOR gate 33 that the next most significant digit is selected for the next output. When the one digit is selected, the decimal point output is a logical one which is stored in decimal point flip-flop 47, which receives an output from digit selector 27. This output is stored during the period when the astable signal is a logical one. The decimal point flip-flop 47 then allows the 300 Hertz tone to pass through AND gate 51 to speaker 19, indicating the positioning of the decimal point in the output indications.

After all of the digits have been indicated (eight digits when utilizing an electronic calculator, for example), the most significant bit of the digit counter will be a logical one, and the digit selector will be inhibited from loading the down counter 39. The logic will then remain in this state until the sign key is again depressed.

FIGS. 4 through 7, taken together, illustrate a working embodiment of the indicating system of this invention. As shown, the system and operation is as described hereinabove with respect to the block diagrams of FIGS. 1 and 2, except that the logic gates, although functionally the same as described with reference to FIGS. 1 and 2, have been implemented with NAND, NOR and NOT gates rather than AND and OR gates in some instances.

Referring now to FIGS. 4 through 7, keyboard 23 is shown to include a plurality of key-actuated switches 201 connected with calculator processing circuitry 25 (calculator integrated circuit designated as MM5738). The $S_a$ through $S_g$ outputs from processing circuitry 25 are coupled by individual leads to code converter 37 with a plurality of resistors 203 individually connected between each lead and ground. In addition, a resistor 204 is connected between the decimal point lead from calculator processing circuitry 25 and ground, with the decimal point lead being connected to decimal point flip-flop 47 (½ MM74C74N—a dual flip-flop).

Outputs $D_1$ through $D_9$ of calculator processing circuitry 25 are coupled by individual leads to key-actuated switches 201 of keyboard 23, to sign and overflow detector 28, and to digit selector 27 (MM74C151N). Sign and overflow detector 28 (CD4002AE) includes a pair of NOR gates 205 each of which receive four inputs and the outputs of which are coupled through NOT gates 207 and NOR gate 208 to flip-flop 209 (½ MM74C74N). A plurality of resistors 211 are connected between ground and each lead from processing circuitry 25 to sign and overflow detector 28.

Sign and overflow detector flip-flop 28 also includes a second flip-flop 213 (½ MM74C74N) with an output from flip-flops 209 and 213 providing inputs to NAND gate 215, the output of which provides a sign indicating output to NAND gate 177. A sign input to flip-flop 209 is provided through NAND gate 217 and gate 218 (MM74C30N) which receives as inputs $\overline{S_a}$ through $\overline{S_g}$ as well as being connected with digit counter 29 (MM74C193N). An OVERFLOW input to flip-flop 213 is provided through NOT gate 220 from gate 221 (MM74C30N) which receives $S_a$, $\overline{S_b}$, $\overline{S_c}$, $S_d$, $S_e$, $S_f$ and $S_g$ inputs as well as being connected with digit counter 29. In addition, flip-flop 213 has an input connected through NOT gate 223 to the $D_9$ output from calculator processing circuitry 25, and sign key 225 is connected with flip-flop 209 through NOT gate 226, NOT gate 226 also being connected with digit counter 29 through resistor 227.

Digit Selector 27 is connected by four leads to digit counter 29 with the strobe connection also being connected with timer 59. In addition, digit selector 27 provides an input to leading zero suppressor 31 which includes gate 230. Gate 230 receives, in addition, inputs $\overline{S_a}$ through $\overline{S_g}$, and provides an output to NOR gate 33 through NOT gate 231, with the output of NOR gate 33 being coupled to digit counter 29.

The $S_a$ through $S_f$ outputs of calculator processing circuitry 25 are coupled through a plurality of NOT gates 233 to provide the $\overline{S_a}$ through $\overline{S_f}$ outputs with the $\overline{S_b}$, $\overline{S_c}$, and $\overline{S_f}$ outputs being coupled to code converter 37. Code converter 37 includes a plurality of NAND gates 235 receiving as inputs various S and $\overline{S}$ outputs, as shown, with $S_g$ being directly provided and being provided through NOT gate 237 to one gate 235. NAND gates 235 are, in turn, connected by groups, again as shown in the drawings, to a second set of four NAND gates 239 which provides the binary coded decimal output. In addition, NAND gates 241 and 242 are provided to couple back outputs $\overline{S_A}$ and $\overline{S_D}$, respectively, with NOT gates 243 and 244 being provided to couple back $S_A$ and $S_D$, respectively.

The four outputs from NAND gate 239 are individually coupled to down counter 39 (MM74C193N), and the four outputs are also coupled to zero suppressor 38 which includes NOR gate 241 receiving the four outputs from gates 239 and supplying an input to NOR gates 242 each of which receive a second input from gates 239. The outputs from NOR gates 242 are coupled through NOT gates 243 to two inputs to down counter 39 (the 2 and 8 inputs).

Figure 7:
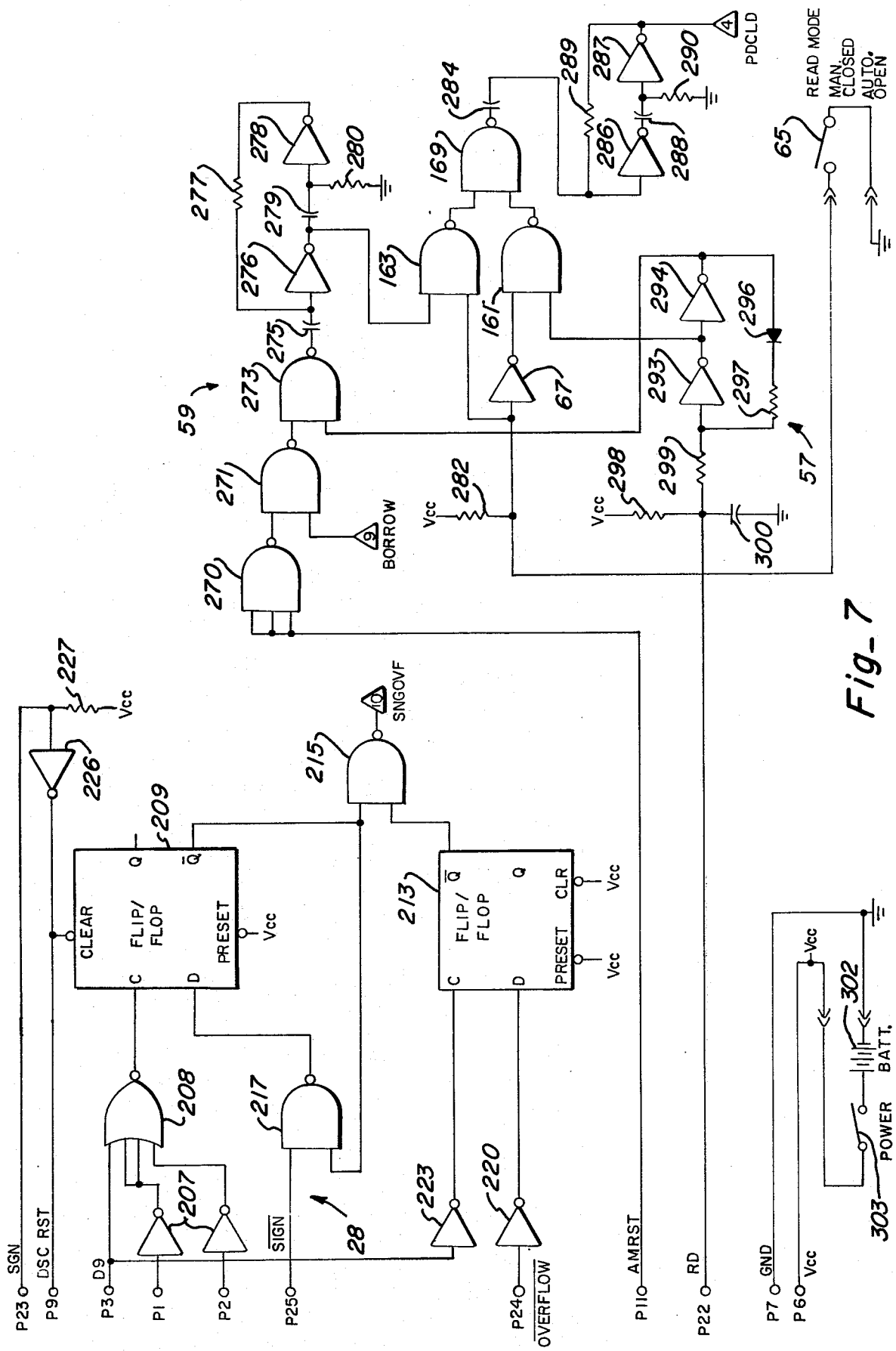

Down counter 39 is connected with astable multivibrator 41 with the borrow output from down counter 39 being connected through NAND gate 173 and NOT gate 246 to provide the astable input to multivibrator 41. The reset input to multivibrator 41 is provided through NOT gate 247 from counter 29 with the input side of NOT gate 247 being connected to the $V_{cc}$ connection with down counter 39 through resistor 248 and with ground through capacitor 249. As shown in FIG. 7, a remote switch 251 can be utilized in conjunction with resistors 252 and 253 and capacitor 254.

The clock down output from astable multivibrator 41 is coupled to down counter 39 and to NAND gate 179. A second input to NAND gate 179 is coupled thereto from 600 $H_z$ oscillator 17, shown in FIGS. 5 through 7 to include NOT gates 256 and 257, resistors 258 and 259, and capacitor 260. The output from NAND gate 179 is coupled through NOT gate 262 and resistor 81 to audio amplifier 83 (LM380N).

The output from 600 $H_z$ oscillator 17 is also coupled to NAND gate 177 (which also receives the sign indicating output from NAND gate 215) and divide-by-two circuit 53 (flip-flop ½ MM74C74N). The 300 $H_z$ output signal from flip-flop 53 is coupled to NAND gate 151 which receives a second input from decimal point flip-flop 47. The outputs from NAND gates 151 and 177 are coupled to NAND gate 185, the output of which is coupled through resistor 87 to audio amplifier 83.

Audio amplifier 83 supplies an output through capacitor 264 to speaker 19 and/or earphone jack 265, with a return to ground being supplied through capacitor 266. The $V_{cc}$ input to audio amplifier 83 has a bypass capacitor 267 to ground.

Timer 59 includes NAND gate 270 receiving the strobe input from digit selector 27 and supplies one input to NAND gate 271 which receives a second input from the borrow output from down counter 39. The output from NAND gate 271 supplies an input to NAND gate 273 which receives a second input from Schmidt trigger 57. The output from NAND gate 273 is connected through capacitor 275 to NOT gate 276 and through capacitor 275 and resistor 277 to NOT gate 278 with the NOT gates being connected through capacitor 279 and having a resistor 280 to ground connected to the junction of capacitor 279 and NOT gate 278.

An input to NAND gate 163 is coupled from the output of NOT gate 276 with a second input to NAND gate 163 being provided by opening mode switch 65 connected in series with resistor 282 between the $V_{cc}$ input and ground. Mode switch 65 is also connected through NOT gate 67 to NAND gate 161 (from manual made operation). The outputs from NAND gates 161 and 163 are coupled to NAND gate 169 the output from which is coupled through capacitor 284 to one shot multivibrator 71. Multivibrator 71 includes NOT gates 286 and 287 connected to one another by capacitor 288 and by resistor 289 and having a resistor 290 to ground as well as the load strobe output coupled from NOT gate 287.

Schmidt trigger 57, which is connected to read key 292 of keyboard 23, includes NOT gates 293 and 294 having series connected diode 296 and resistor 297 connected thereto. In addition, the $V_{cc}$ input is connected with NOT gate 293 through resistors 298 and 299 the junction of which has a bypass capacitor 300 to ground connected thereto.

As shown in the drawings, the $V_{cc}$ (power supply) output is supplied by battery 302 (or its equivalent) through power switch 303.

As can be appreciated from the foregoing, the indicating system of this invention provides an improved system and method for providing non-visual output indications.

What is claimed is:

1. An audio indicating system providing a calculator output in audio form by individual digits, said system comprising: input means to receive electrical signals indicative of retrievable information and producing output signals reflective thereof; signal controlling means connected with said input means and receiving said output signals therefrom, said signal controlling means providing a coded output signal the composition of which depends upon said output signal received from said input means; audio means connected with said signal controlling means to receive said coded output signal therefrom, said audio means, in response to received coded output signals from said signal controlling means, providing, for each of said individual digits, a preselected number of audio tones at substantially the same predetermined frequency with the number of said tones being determined by the composition of said coded signal received from said signal processing means; and means for causing a second output from said audio means at a frequency different from that of said predetermined frequency and causing an audio indication of the positioning of a decimal point in said output.

2. An audio indicating system providing a calculator output in audio form by individual digits, said system comprising: input means to receive electrical signals indicative of retrievable information and producing output signals reflective thereof; signal controlling means connected with said input means and receiving said output signals therefrom, said signal controlling means providing a coded output signal the composition of which depends upon said output signal received from said input means; audio means connected with said signal controlling means to receive said coded output signal therefrom, said audio means, in response to received coded output signals from said signal controlling means, providing, for each of said individual digits, a preselected number of audio tones at substantially the same predetermined frequency with the number of said tones being determined by the composition of said coded signal received from said processing means; and means for causing an initial output indicative of the sign of said output.

3. The audio indicating system of claim 1 wherein said audio means is caused by said controlling means to provide individual audio tones in the range of between 1 and 10 to indicate numerically each calculator digit indication.

4. The audio indicating system of claim 1 wherein said signal controlling means includes a data responsive controller and an indicator control.

5. The audio indicating system of claim 1 wherein said signal controlling means includes a counter and a multivibrator, the oscillations of said multivibrator being controlled by said counter to thereby control said audio tones produced by said audio means.

6. An audio indicating system providing a calculator output in audio form by individual digits, said system comprising: input means to receive electrical signals indicative of retrievable information and producing output signals reflective thereof; signal controlling means connected with said input means and receiving said output signals therefrom, said signal controlling means providing a coded output signal the composition of which depends upon said output signal received from said input means; audio means including an audio oscillator, a speaker and a gate connected between said oscillator and speaker, said gate being connected with said signal controlling means to receive said coded output signal therefrom, said audio means, in response to received coded output signals from said signal controlling means, providing, for each of said individual digits, a preselected number of audio tones of substantially equal duration and at substantially the same predetermined frequency with the number of said tones being determined by the composition of said coded signal received from said signal processing means; and means for causing a second output from said audio means at a frequency different from that of said predetermined frequency and causing an audio indication of the positioning of a decimal point in said output.

7. An audio indicating system providing a calculator output in audio form by individual digits, said system comprising: input means to receive electrical signals indicative of retrievable information and producing output signals reflective thereof; signal controlling means connected with said input means and receiving said output signals therefrom, said signal controlling means providing a coded output signal the composition of which depends upon said output signal received from said input means; audio means including an audio oscillator, a speaker and a gate connected between said oscillator and speaker, said gate being connected with said signal controlling means to receive said coded output signal therefrom, said audio means, in response to received coded output signals from said signal controlling means, providing, for each of said individual digits, a preselected number of audio tones of substantially equal duration and at substantially the same predetermined frequency with the number of said tones being determined by the composition of said coded signal received from said signal processing means; and means for causing an initial output indicative of the sign of said output.

8. A sightless output system, comprising: input means to receive electrical signals indicative of retrievable information and providing signals reflective thereof; signal controlling means connected with said input means to receive said signal therefrom, said signal controlling means providing a predetermined pulse coded output signal reflecting said signals received from said input means; sightless sensing means connected with said signal controlling means so that said sightless sensing means provides a discernible output by digits based upon the pulse coded signal received from said signal controlling means, said discernible output from said sightless sensing means indicating in a sightless retrievable form the information included in said electrical input signals received at said input means; and means providing suppression of a discernible output at said sensing means that is indicative of zero as a said digit until after a discernible output at said sensing means of a digit other than zero in information coupled to said input means.

9. The sightless indicating system of claim 8 wherein said signal controlling means includes a code converter for receiving said signals from said input means whereby said signal controlling means provides said pulse coded signal to said sightless sensing means.

10. An audio indicating system for a calculator, said audio indicating system comprising: input means to receive electrical signals indicative of retrievable information and producing signals reflective thereof; signal controlling means including means providing a predetermined pulse-coded output signal reflecting the signals received by said signal controlling means from said input means, means providing a signal for enabling an initial output indicative of the sign of a calculation by said calculator, and means providing a signal for enabling an audio indication of the positioning of a decimal point in an audible indication of a calculation by said calculator; and audio means providing a calculator output in audio form by individual digits, said audio means being connected with said signal controlling means to receive said signals therefrom, said audio means, in response to received pulse coded signals from said signal controlling means, providing a predetermined number of audible tones the number of which is dependent upon the number of pulses in said pulse coded signal received from said signal controlling means with said audible output including an indication of the sign and decimal positioning of the calculated result indicated.

11. The audio indicating system of claim 6 wherein said means providing said predetermined pulse coded output signal includes a counter and a multivibrator with operation of said multivibrator being controlled by said counter whereby the number of pulses is determined by the electrical signals received by said input means.

12. The audio indicating system of claim 7 wherein said signal controlling means includes a binary code converter connected between said input means and said counter.

13. An audio indicating system for a calculator having circuitry adapting said calculator to provide an output by individual digits, said audio indicating system comprising: a code converter connected to said circuitry of said calculator to receive electrical signals indicative of retrievable information by digits therefrom; a multivibrator providing output pulses when in an operative state; a down counter connected with said multivibrator and said code converter, said down counter responsive to received input signals from said code converter determining the number of pulses produced by said multivibrator while in said operative state; indicator control means connected with said multivibrator and down counter to cause said multivibrator to assume said operative state so that outputs pulses are thereafter produced by said multivibrator with the number of pulses being representative of each digit of the retrievable information in said electrical signals received by said code converter from said circuitry of said calculator; a gate receiving said pulses from said multivibrator; an audio oscillator connected with said gate and providing an output thereto at a predetermined audio frequency; a speaker connected with said gate and providing an audible indication of the number of pulses coupled to said gate from said multivibrator whereby an audible output is provided for said calculator; and means connected with said audio oscillator, said speaker and said circuitry of said calculator to produce an output indication of the sign of information from said circuitry coupled to said code converter.

14. The indicating system of claim 13 wherein said circuitry of said calculator provides a seven segment output and wherein said code converter is a binary code converter receiving said seven segment output and converting the same to binary decimal form for coupling to said down counter.

15. The audio indicating system of claim 13 wherein said multivibrator is a gated astable multivibrator.

16. The audio indicating system of claim 13 wherein said indicator control means includes means for automatic and manual sequencing of said calculator output by digits.

17. The audio indicating system of claim 13 wherein said audio control means includes a one shot multivibrator the output of which is connected with said down counter and said multivibrator, and wherein said indicator control means also includes a timer and Schmidt trigger with said timer being controlled by an output from said Schmidt trigger and said timer output being connectable with said one shot multivibrator.

18. An audio indicating system for a calculator having circuitry adapting said calculator to provide an output by individual digits, said audio indicating system comprising: a code converter connected to said circuitry of said calculator to receive electrical signals indicative of retrievable information by digits therefrom; a multivibrator providing output pulses when in an operative state; a down counter connected with said multivibrator and said code converter, said down counter responsive to received input signals from said code converter determining the number of pulses produced by said multivibrator while in said operative state; indicator control means connected with said multivibrator and down counter to cause said multivibrator to assume said operative state so that output pulses are thereafter produced by said multivibrator with the number of pulses being representative of each digit of the retrievable information in said electrical signals received by said code converter from said circuitry of said calculator; a gate receiving said pulses from said multivibrator; an audio oscillator connected with said gate and providing an output thereto at a predetermined audio frequency; a speaker connected with said gate and providing an audible indication of the number of pulses coupled to said gate from said multivibrator whereby an audible output is provided for said calculator; and frequency divider means connected with said audio oscillator, and means connected with said speaker, said frequency divider and said circuitry of said calculator to produce an output indicative of the position of a decimal point in information from said circuitry coupled to said code converter.

19. An audio indicating system for a calculator having circuitry adapting said calculator to provide an output by individual digits, said audio indicating system comprising: a code converter connected to said circuitry of said calculator to receive electrical signals indicative of retrievable information by digits therefrom; a multivibrator providing output pulses when in an operative state; a down counter connected with said multivibrator and said code converter, said down counter responsive to receive input signals from said code converter determining the number of pulses produced by said multivibrator while in said operative state; indicator control means connected with said multivibrator and down counter to cause said multivibrator to assume said operative state so that output pulses are thereafter produced by said multivibrator with the number of pulses being representative of each digit of the retrievable information in said electrical signals received by said code converter from said circuitry of said calculator; a gate receiving said pulses from said multivibrator; an audio oscillator connected with said gate and providing an output thereto at a predetermined audio frequency; a speaker connected with said gate and providing an audible indication of the number of pulses coupled to said gate from said multivibrator whereby an audible output is provided for said calculator; and means providing suppression of indications at said speaker indicative of zero as a said digit until after an indication at said speaker of a digit other than zero in information coupled to said code converter from said circuitry of said calculator.

20. The audio indicating system of claim 19 wherein said means providing suppression includes a digit selector means, leading zero suppression means, and digit counter means.

21. The audio indicating system of claim 13 wherein said calculator includes a keyboard and wherein said keyboard includes keys for causing operation of said indicator control means.

22. A calculator having an audible output, said calculator comprising: a keyboard; calculator processing circuitry connected with said keyboard and providing output by segments indicative of a calculation performed by said calculator; a code converter for receiving said segments from said calculator processing circuitry and converting the same to a binary decimal form; a down counter for receiving said output from said code converter in binary decimal form; a gated astable multivibrator connected with said down counter, said multivibrator producing output pulses when in an operative state with the number of such pulses being controlled by said down counter; indicator control means connected with said keyboard and said multivibrator to initiate the operative state of said multivibrator; a gate connected with said multivibrator to receive the pulses therefrom; an oscillator oscillating at a predetermined audio frequency with the output being coupled to said gate; a speaker connected with said gate to provide audible indications of the pulses coupled to said gate from said multivibrator; and means for suppressing indications at said speaker indicative of zero until after an indication other than zero is presented at said speaker, said calculator also including means connected with said keyboard and said speaker for indicating by audible tones at the frequency of said oscillator the sign of said calculation by said calculator, and said calculator further including means providing at said speaker an audible tone different from that of said oscillator, said different tone being indicative of a decimal point in said calculations by said calculator.

23. The calculator of claim 22 wherein said keyboard includes an output key and a sign key, wherein said indicator control means is activated by said output key, and wherein said means for indicating the sign of said calculation by said calculator includes sign detector means connected with said processing circuitry of said calculator, said indication of sign being controlled by actuation of said sign key.

24. An audible indicating method for indicating the results of a calculation, said method comprising: providing coded electrical output signals indicative of a calculation; utilizing said coded electrical output signals to produce an indication of said calculation by a predetermined number of audio tones at substantially the same frequency with the number of said tones being indicative of the information to be retrieved; providing an indication of the sign of said produced indication of said calculation; and providing an indication of the positioning of a decimal point in said indicated calculation.

25. The method of claim 24 wherein said retrievable information includes at least one decimal number, and wherein the number of audible tones equals the decimal number.

26. The method of claim 24 wherein said retrievable information includes a plurality of digits of information, wherein said audio outputs sequentially indicate a plurality of digits of retrievable information, and wherein each of said plurality of digits is a decimal number that is sequentially indicated by audible tones with each digit being individually indicated by a number of audible tones equal to the decimal number.

* * * * *

UNITED STATES PATENT AND TRADEMARK OFFICE
CERTIFICATE OF CORRECTION

PATENT NO. : 4,014,016
DATED : March 22, 1977
INVENTOR(S) : Jay G. Sherritt; Joseph A. Eccher It is certified that error appears in the above-identified patent and that said Letters Patent are hereby corrected as shown below:

Column 1, line 40, correct "3,758,885" to --3,758,855--.

Signed and Sealed this

Twenty-fourth Day of May 1977

[SEAL]

Attest:

RUTH C. MASON
*Attesting Officer*

C. MARSHALL DANN
*Commissioner of Patents and Trademarks*